(12) United States Patent
Phillips

(10) Patent No.: US 7,478,519 B2
(45) Date of Patent: Jan. 20, 2009

(54) MOUNTING ROTARY CUTTING DECK TO LIFT ARM

(75) Inventor: David Lawrence Phillips, Willow Springs, NC (US)

(73) Assignee: Deere & Company, Moline, IL (US)

( * ) Notice: Subject to any disclaimer, the term of this patent is extended or adjusted under 35 U.S.C. 154(b) by 512 days.

(21) Appl. No.: 11/251,191

(22) Filed: Oct. 13, 2005

(65) Prior Publication Data

US 2007/0084173 A1 Apr. 19, 2007

(51) Int. Cl.
*A01D 34/00* (2006.01)
(52) U.S. Cl. .................................................. 56/15.9
(58) Field of Classification Search ............... 56/15.9, 56/17.1, 15.1, 15.2, 15.8, 15.6, 15.7, 17.2, 56/DIG. 14, DIG. 22; 180/19.1, 13.3; 280/455.1; 172/446
See application file for complete search history.

(56) References Cited

U.S. PATENT DOCUMENTS

| | | | | |
|---|---|---|---|---|
| 3,816,985 | A * | 6/1974 | Sorenson et al. | 56/7 |
| 3,824,772 | A * | 7/1974 | Sorenson et al. | 56/7 |
| 4,195,860 | A * | 4/1980 | Helams | 172/451 |
| 4,769,976 | A * | 9/1988 | Bassett et al. | 56/7 |
| 4,930,801 | A * | 6/1990 | Gillund | 280/481 |
| 5,154,043 | A * | 10/1992 | Schemelin et al. | 56/12.7 |
| 5,193,330 | A * | 3/1993 | Nusser | 56/6 |
| 5,423,565 | A * | 6/1995 | Smith | 280/411.1 |
| 5,623,817 | A * | 4/1997 | Bricko et al. | 56/7 |
| 5,715,667 | A * | 2/1998 | Goman et al. | 56/13.6 |
| 5,970,690 | A * | 10/1999 | Toman | 56/7 |
| 6,347,671 | B1 * | 2/2002 | Stiller et al. | 172/439 |
| 6,698,171 | B2 * | 3/2004 | Doerflinger | 56/7 |
| 6,928,798 | B2 * | 8/2005 | Hensley et al. | 56/14.9 |

OTHER PUBLICATIONS

Toro Groundsmaster 4500-D & 4700-D. Product Brochure [online]. The Toro Company, 2002 [retrieved in Sep. 2005]. Retrieved from the Internet: <URL: http://www.toro.com/golf/mower/rough/gm4500_4700/gm4500_4700_brochure.pdf.html>.
Jacobsen AR 250 & AR 250 Turbo. Parts Manual [online]. Textron, Inc., 2001 [retrieved in Sep. 2005]. Retrieved from the Internet: <URL: http://www.ransomes-jacobsen.biz/specifications/technical_manuals/24353gr1.pdf.html>.
Jacobsen AR 250 Turbo Rotary Mower. Product Brochure [online]. Textron, Inc. [retrieved on Sep. 19, 2005.] Retrieved from the Internet: <URL: http://www.ransomesjacobsen.com/brands/jacobsen/new_jac_ar250_01.html>.

* cited by examiner

Primary Examiner—Árpád Fábián-Kovács

(57) ABSTRACT

A mounting device to connect a rotary cutting deck to a lift arm includes a bracket having a first pivoting connection and a second pivoting connection parallel to the first pivoting connection. The first pivoting connection is connected to the lift arm and the second pivoting connection is connected to the rotary cutting deck. The pair of pivoting connections allow the deck to pitch. The bracket may be channel shaped and may have an opening or slot through which the lift arm extends. Additionally, a T-shaped pivot pin provides a third pivoting connection between the lift arm and bracket, the third pivoting connection being perpendicular to the first and second pivoting connections.

20 Claims, 3 Drawing Sheets

MOUNTING ROTARY CUTTING DECK TO LIFT ARM

FIELD OF THE INVENTION

The present invention relates to grass mowing equipment with multiple rotary cutting decks, and specifically to mounting rotary cutting decks to the ends of lift arms extending laterally from a traction vehicle.

BACKGROUND OF THE INVENTION

Grass mowing equipment for large areas may include multiple rotary cutting decks, each rotary cutting deck mounted to the end of an independent lift arm extending from a traction vehicle. For example, each rotary cutting deck may be mounted to the forward end of a lift arm using a mounting device that includes a yoke with a crossbar that extends laterally over and spans the cutting deck. The yoke or crossbar may be attached at pivoting joints in side plates at the left and right edges of the deck. When the rotary cutting deck is on the ground, the mounting device should allow for pitch (front to back pivoting) and yaw (side-to-side pivoting).

A mounting device for a rotary cutting deck should satisfy several requirements. For example, the mounting device needs to absorb shocks from impacts while maintaining its integrity. The mounting device should limit the maximum tilt and yaw angles so they do not exceed ANSI limits. When the rotary cutting deck is raised for transport, the mounting device should provide sufficient stability to prevent the deck from swinging wildly during vehicle turns, or during sudden starts or stops. The mounting device should allow the rotary cutting deck to pitch as required to drive the vehicle up standard trailer ramps without bottoming out.

Some existing mounting devices for rotary cutting decks satisfy at least some of these requirements, but the mounting devices tend to be heavy, bulky and expensive to manufacture. A relatively simple, inexpensive mounting device for a rotary cutting deck is needed that can absorb shocks from impacts, limit maximum tilt and yaw angles, provide sufficient stability to prevent the deck from swinging excessively when raised for transport, and allow the deck to pitch as required to drive up trailer ramps.

SUMMARY OF THE INVENTION

A mounting apparatus for a rotary cutting deck includes a T-shaped pivot pin with a post inserted into a socket in the forward end of a lift arm. A channel shaped bracket between the T-shaped pivot pin and the rotary cutting deck provides a pair of pivoting connections for the deck to pitch. A first pivoting connection allows the bracket to pivot with respect to the T-shaped pivot pin on a first pivot axis, and a second pivoting connection allowing the bracket to pivot with respect to the rotary cutting deck on a second pivot axis parallel to the first pivot axis. The T-shaped pivot pin also provides a third pivot axis for the rotary cutting deck to yaw.

DESCRIPTION OF THE PREFERRED EMBODIMENT

Figure 1:
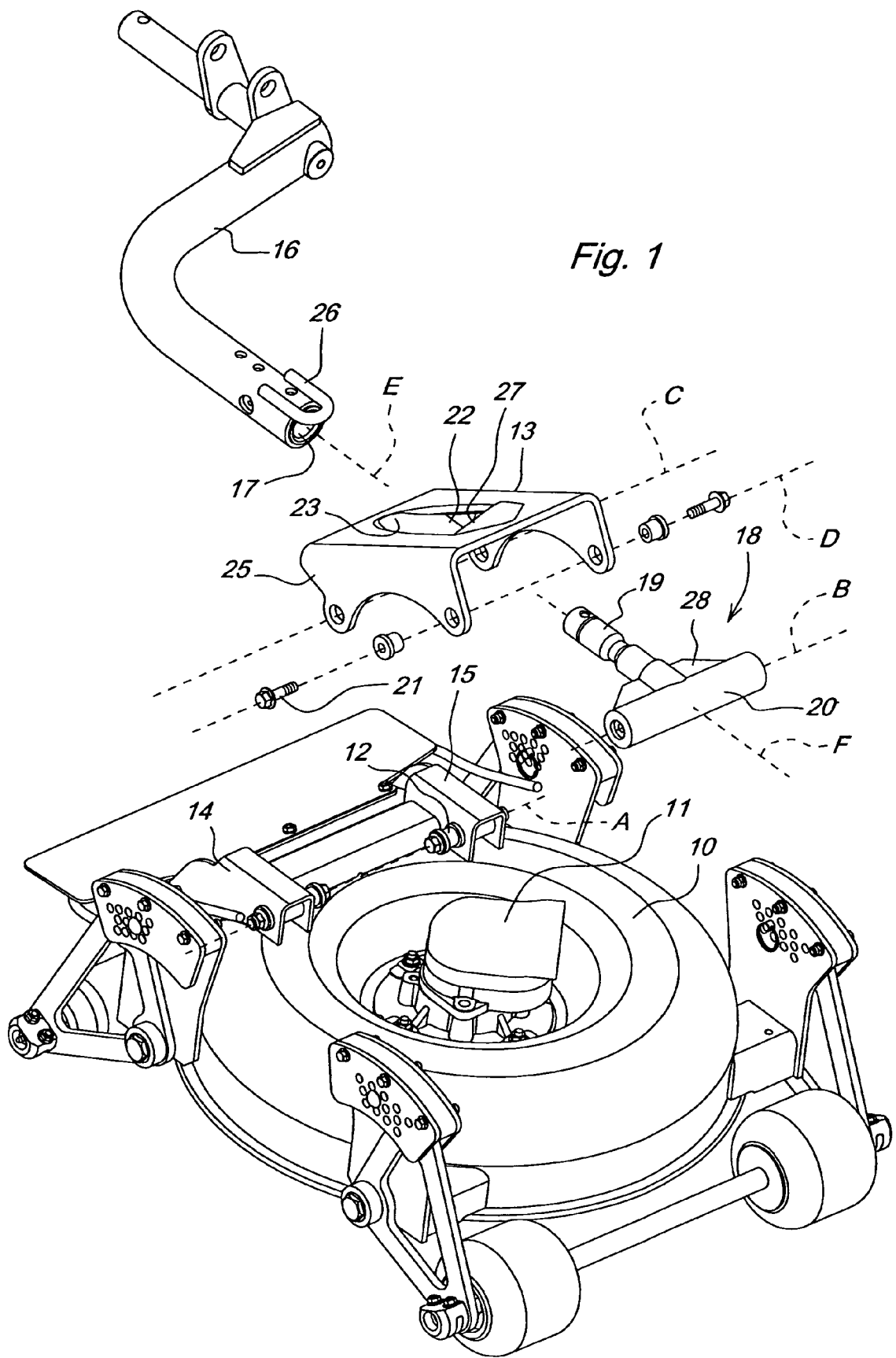
FIG. 1 is a partially exploded perspective view of a rotary cutting deck mounted to a lift arm according to a first embodiment of the invention.
Figure 2:
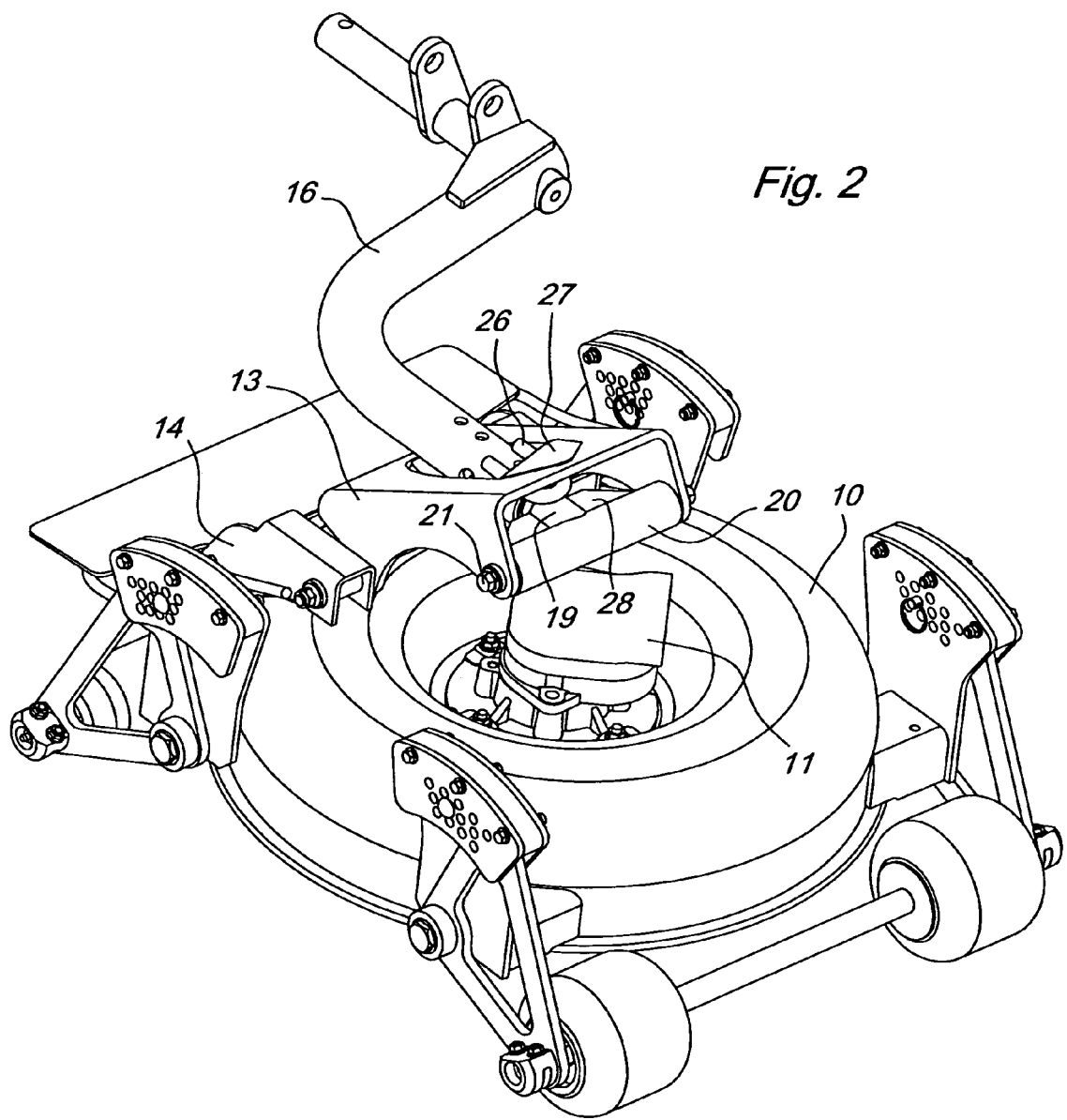
FIG. 2 is a perspective view of a rotary cutting deck mounted to a lift arm according to a first embodiment of the invention.

As shown in FIGS. 1 and 2, in a first embodiment, rotary cutting deck 10 may carry a motor such as hydrostatic motor 11 to turn a cutting blade attached to a generally vertically aligned spindle under the deck. Optionally, the rotary cutting deck may be supported over the ground surface by anti-scalp wheels or rollers that may be adjusted to raise or lower the deck to a desired cutting height.

Figure 3:
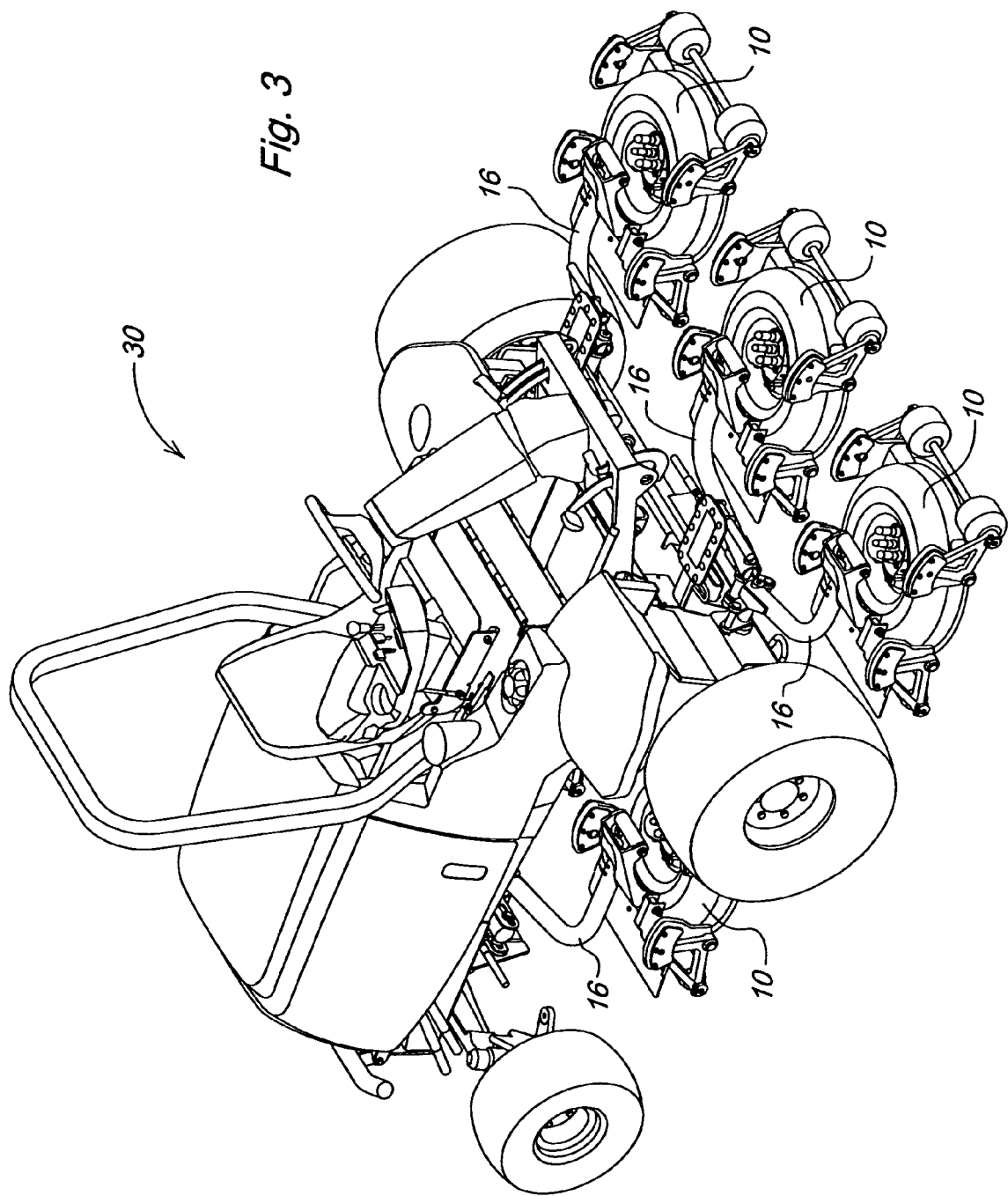
FIG. 3 is a perspective view of a traction vehicle carrying rotary cutting decks mounted to lift arms according to a first embodiment of the invention.

In FIGS. 1 and 2, only one rotary cutting deck is shown. FIG. 3 shows traction vehicle 30 that may carry multiple rotary cutting decks, each rotary cutting deck supported by a lift arm 16 extending from the vehicle. Each cutting deck may be raised and lowered by use of hydaulic controls that may be operated from the vehicle.

In one embodiment, a first or back end of each lift arm 16 may be pivotably connected to a frame member at the side or front of the traction vehicle. The second or forward end of the lift arm may be attached to the rotary cutting deck so that the deck may yaw (pivot side-to-side) and pitch (pivot front-to-back).

In one embodiment, channel shaped bracket 13 may be pivotably attached to rotary cutting deck 10 by inserting a first pair of pivot bushings 29 through holes in the channel shaped bracket at axis C. Axis C may be generally horizontal and perpendicular to the direction of travel. When the first pair of pivot bushings are inserted through the holes at axis C to align with pivot axis A, the channel shaped bracket may pivot front-to-back with respect to rotary cutting deck 10.

In one embodiment, the first pair of pivot bushings 29 may be fastened to each of the right and left arms 14, 15 that extend from the rear of the rotary cutting deck forwardly adjacent the right and left sides of the deck. The first pair of pivot bushings may be fastened to the right and left arms on axis A which is horizontal and parallel to the ground, perpendicular to the direction of travel, and substantially toward the rear end of the rotary cutting deck.

In one embodiment, channel shaped bracket 13 may be pivotably attached to lift arm 16 by inserting a second pair of pivot bushings 21 through the holes in channel shaped bracket at axis D. Axis D also may be horizontal and perpendiuclar to the direction of travel. When the second pair of pivot bushings are inserted through the holes at axis D to align with pivot axis B, the channel shaped bracket may pivot front-to-back with respect to lift arm 16. Axis B is parallel to axis A.

In one embodiment, the second pair of pivot bushings 21 may be fastened to each end of crossbar 20 of T-shaped pivot pin 18 along axis B. Post 19 of the T-shaped pivot pin may be inserted into socket 17 in the second end of lift arm 16, and retained with a cross pin. The slot in post 19 may allow the T-shaped pivot pin to turn within the socket, which provides for a side-to-side, or yaw, pivot. This pivoting is on a third generally horizontal axis that is parallel to the direction of travel.

In one embodiment, the mounting device provides two parallel pivot axes for additional pitch freedom for a rotary cutting deck. This is accomplished by providing channel shaped bracket 13 with two axes allowing front-to-back pivoting.

In one embodiment, when the rotary cutting deck is on the ground surface, channel shaped bracket 13 may be tilted upward facing toward the front of the rotary cutting deck. The base of channel shaped bracket 13 may include slot or opening 22 through which the second end of lift arm 16 and/or post 19 may be inserted. By this arrangement, the dimensions of slot or opening 22 may provide limits for front-to-back pivoting of the rotary cutting deck, as will be explained below.

In one embodiment, the rear end 23 of slot or opening 22 may be positioned to contact the bottom of lift arm 16 to limit how low the lift arm can move down relative to the rotary cutting deck. The front end 24 of slot or opening 22 may be positioned to limit how far channel shaped bracket 13 can pivot down relative to the lift arm.

In one embodiment, the rear end of channel shaped bracket 13 may include notch 25 that may contact a structural member on or adjacent the rear of the rotary cutting deck to limit the maximum angle of rotation of the channel shaped bracket relative to the deck.

In one embodiment, when the rotary cutting deck is on the ground surface, lift arm 16 may be loaded in the downward direction by a hydraulic cylinder or other means such as springs. In the downward loaded position, rear end 23 of slot or opening 22 is forced against the bottom of lift arm 16. This force urges the rotary cutting deck in the downward direction.

In one embodiment, if lift arm 16 is then raised, channel shaped bracket 13 rotates relative to the lift arm until notch 25 at the rear of the channel shaped bracket contacts a structural member at the rear of the rotary cutting deck. When notch 25 contacts the structural member on the deck, the rear of the deck starts to be lifted. As the rear of the rotary cutting deck rises, the center of gravity of the deck aligns with the D and B pivot axes and the deck hangs in a substantially horizontal position, which may be parallel with the ground.

In one embodiment, the forward end of lift arm 16 may include a U-shaped pin 26 welded to the outside of the lift arm. The two ends of pin 26 may be parallel, and the pin may be located so that one of its parallel legs may be located vertically on top of the lift arm when the lift arm is in its fully raised position. The outboard leg of pin 26 may be tangent to the lift arm. Channel shaped bracket 13 may have a notch 27 at the forward end 24 of slot or opening 22. As lift arm 16 is raised and channel shaped bracket 13 pivots downward, notch 27 engages the leg of U-shaped pin 26 and locks up the yaw pivot, thus stabilizing the rotary cutting deck in its raised position.

In one embodiment, as lift arm 16 is lowered, notch 27 disengages from U-shaped pin 26, so that the rotary cutting deck can pivot side-to-side as it reaches the ground contour. U-shaped pin 26 also may provide an additional function. T-shaped pivot pin 18 may have a web 28 on both sides between post 19 and crossbar 20. When lift arm 16 is down, either side of pivot pin web 28 may contact a leg of the U-shaped pin 26 which provides an abutment that blocks excessive side-to-side pivoting, or yaw, of the cutting deck beyond a specified ANSI limit.

The invention provides a relatively simple and inexpensive apparatus for a rotary cutting deck to be mounted to a lift arm and provide for full float of the deck for following ground contours. Additionally, the mounting device allows sufficient forward pivot angle so that trailer ramps may be climbed without bottoming out. Further, the mounting device provides for stabilization of cutting units in the raised, or transport, position.

Having described the preferred embodiment, it will become apparent that various modifications can be made without departing from the scope of the invention as defined in the accompanying claims.

The invention claimed is:

1. An apparatus comprising:
    a lift arm having a first end connected to a traction vehicle and a second end having a socket;
    a T-shaped pivot pin having a post inserted into the socket and a crossbar; and
    a channel shaped bracket connecting the T-shaped pivot pin to a rotary cutting deck, the channel shaped bracket having a first pivoting connection allowing the bracket to pivot with respect to the T-shaped pivot pin on a first pivot axis, and a second pivoting connection allowing the bracket to pivot with respect to the rotary cutting deck on a second pivot axis parallel to the first pivot axis.

2. The apparatus of claim 1 wherein the channel shaped bracket includes a slot through which the lift arm and post extend.

3. The apparatus of claim 1 wherein the post inserted into the socket is pivotable on a third pivot axis perpendicular to the first and second pivot axes.

4. The apparatus of claim 3 further comprising a web between the post and a crossbar of the T-shaped pivot pin, the web contacting an abutment adjacent the second end of the lift arm to limit pivoting of the post within the socket.

5. The apparatus of claim 1 wherein the channel shaped bracket includes a notch blocking pivoting of the channel shaped bracket.

6. A mounting device connecting a rotary cutting deck to a lift arm comprising:
    a bracket having a first pivoting connection and a second pivoting connection parallel to the first pivoting connection;
    the first pivoting connection connected to the lift arm and the second pivoting connection connected to the rotary cutting deck; and
    a slot in the bracket through which the lift arm extends to limit pivoting of the bracket with respect to the lift arm.

7. The mounting device of claim 6 wherein the second pivoting connection is connected to the rotary cutting deck adjacent a rear portion of the deck.

8. The mounting device of claim 6 wherein the bracket is channel shaped.

9. A mounting device connecting a rotary cutting deck to a lift arm comprising:
    a bracket having a first pivoting connection and a second pivoting connection parallel to the first pivoting connection;
    the first pivoting connection connected to the lift arm and the second pivoting connection connected to the rotary cutting deck;
    a slot in the bracket through which the lift arm extends; and
    a T-shaped pivot pin having a third pivoting connection between the lift arm and the bracket; the third pivoting connection perpendicular to the first and second pivoting connections.

10. The mounting device of claim 9 further comprising a U-shaped pin on the end of the lift arm limiting the rotation of the third pivoting connection.

11. The mounting device of claim 9 wherein the T-shaped pivot pin includes a post and a crossbar with web sections therebetween.

12. An apparatus comprising:
    a rotary cutting deck having a blade rotating on a generally vertical spindle;
    a bracket pivotably connected to a rear portion of the rotary cutting deck on a first generally horizontal axis;

a T-shaped pivot pin pivotably connected to the bracket on a second generally horizontal axis forwardly of the first axis; and a lift arm pivotably connected to the T-shaped pivot pin on a third generally horizontal axis.

13. The apparatus of claim 12 wherein the bracket is channel shaped.

14. The apparatus of claim 12 further comprising a left arm and a right arm attached to the rotary cutting deck adjacent the rear end thereof; the bracket pivotably connected to the left and right arms.

15. The apparatus of claim 12 wherein the rotary cutting deck is pivotable to pitch on both of the first and second generally horizontal axes.

16. The apparatus of claim 12 further comprising a notch in the bracket and a pin on the lift arm, the notch engaging the pin to lock the rotary cutting deck in a position parallel to the ground when the deck is raised with the lift arm.

17. The apparatus of claim 16 wherein the T-shaped pivot pin includes a post and a crossbar with a web extending therebetween, the web abutting the pin at a maximum yaw of the rotary cutting deck.

18. The apparatus of claim 12 wherein the first and second generally horizontal axes are perpendicular to the direction of travel, and the third generally horizontal axis is parallel to the direction of travel.

19. The apparatus of claim 12 wherein the lift arm extends generally laterally from a traction vehicle and may be pivoted to raise and lower the rotary cutting deck.

20. An apparatus comprising:

a rotary cutting deck having a blade rotating on a generally vertical spindle;

a bracket pivotably connected to the rotary cutting deck on a first generally horizontal axis;

a T-shaped pivot pin pivotably connected to the bracket on a second generally horizontal axis;

a lift arm pivotably connected to the T-shaped pivot pin on a third generally horizontal axis; and an opening in the bracket through which the lift arm extends.

* * * * *